US008843296B2

(12) United States Patent
Pursifull (10) Patent No.: US 8,843,296 B2
(45) Date of Patent: Sep. 23, 2014

(54) METHOD AND SYSTEM FOR ENGINE AIR CONTROL (75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 391 days.

(21) Appl. No.: 13/426,390

(22) Filed: Mar. 21, 2012

(65) Prior Publication Data
US 2013/0253801 A1    Sep. 26, 2013

(51) Int. Cl.
F02D 41/04    (2006.01)
F02D 41/26    (2006.01)

(52) U.S. Cl.
USPC ........... 701/103; 701/110; 123/361; 123/399; 123/320

(58) Field of Classification Search
USPC .................. 701/103, 110; 123/361, 399, 320; 73/114.31, 114.32, 114.36, 114.37
See application file for complete search history.

(56) References Cited

U.S. PATENT DOCUMENTS

| 2,264,126 | A | 11/1941 | Wydler |
| 2,721,629 | A | 10/1955 | Saussard |
| 4,211,200 | A | 7/1980 | Rocchio et al. |
| 4,541,396 | A | 9/1985 | Sato et al. |
| 4,974,444 | A | * 12/1990 | Neubacher ................. 73/114.32 |
| 5,005,550 | A | 4/1991 | Bugin, Jr. et al. |
| 5,108,266 | A | 4/1992 | Hewitt |
| 5,183,023 | A | 2/1993 | Hanson |
| 5,420,793 | A | * 5/1995 | Oo et al. .......................... 701/93 |
| 5,676,101 | A | 10/1997 | Kawai et al. |
| 6,120,414 | A | 9/2000 | Endo et al. |
| 6,334,834 | B1 | 1/2002 | Mizutani et al. |
| 6,347,608 | B1 | 2/2002 | Hara et al. |
| 6,568,175 | B2 | 5/2003 | Izumiura et al. |
| 6,718,822 | B2 * | 4/2004 | Soliman et al. ............ 73/114.32 |
| 6,735,942 | B2 | 5/2004 | Wild et al. |
| 6,754,579 | B2 | 6/2004 | Kamiya et al. |
| 6,773,374 | B2 | 8/2004 | Ogawa et al. |
| 6,857,415 | B2 | 2/2005 | Kayama et al. |
| 6,951,199 | B2 | 10/2005 | Suzuki |
| 7,174,883 | B2 | 2/2007 | Sonoda et al. |
| 7,216,479 | B2 | 5/2007 | Tamura |

(Continued)

FOREIGN PATENT DOCUMENTS

EP    0990793 A3    5/2000
JP    2005171925 A    6/2005
WO    2008084311 A1    7/2008

OTHER PUBLICATIONS

Pursifull, Ross Dykstra et al., "Method and System for Brake Control," U.S. Appl. No. 13/290,873, filed Nov. 7, 2011, 27 pages.

(Continued)

Primary Examiner — Hai Huynh
(74) Attorney, Agent, or Firm — Julia Voutyras; Alleman Hall McCoy Russell & Tuttle LLP (57) ABSTRACT Methods and systems are provided for conditioning a throttle command so that, on average, a difference between an actual airflow rate and a commanded airflow rate is substantially zero. A commanded throttle position is modified with a correction factor to also reduce a throttle angle error. By reducing engine air disturbances, engine performance is improved.

20 Claims, 5 Drawing Sheets

(56) References Cited

U.S. PATENT DOCUMENTS

| | | |
|---|---|---|
| 7,350,495 B2 | 4/2008 | Harada |
| 7,475,951 B2 | 1/2009 | Ichikawa |
| 7,610,140 B2 | 10/2009 | Hirooka |
| 7,650,221 B2 | 1/2010 | Oi et al. |
| 8,087,397 B2 | 1/2012 | Cunningham et al. |
| 2004/0182363 A1 | 9/2004 | Suzuki |
| 2005/0000769 A1 | 1/2005 | Hawener et al. |
| 2007/0295303 A1 | 12/2007 | Hirooka |
| 2008/0121480 A1 | 5/2008 | Kawamori et al. |
| 2008/0264059 A1 | 10/2008 | Hirooka |
| 2008/0267789 A1 | 10/2008 | Hirooka |
| 2010/0036566 A1 | 2/2010 | Hayami |
| 2011/0132311 A1 | 6/2011 | Pursifull et al. |
| 2011/0132336 A1 | 6/2011 | Pursifull et al. |
| 2011/0174266 A1 | 7/2011 | Cunningham et al. |
| 2011/0183812 A1 | 7/2011 | Cunningham et al. |
| 2011/0203269 A1 | 8/2011 | Karnik et al. |
| 2012/0016566 A1 | 1/2012 | Cunningham et al. |

OTHER PUBLICATIONS

Cunningham, Ralph Wayne et al., "Method and System for Controlling Engine Vacuum Production," U.S. Appl. No. 13/104,153, filed May 10, 2011, 33 pages.

Cunningham, Ralph Wayne et al., "Method and System for Providing Vacuum," U.S. Appl. No. 13/050,664, filed Mar. 17, 2011, 44 pages.

Pursifull, Ross Dykstra, "Method and System for Prioritizing Vehicle Vacuum," U.S. Appl. No. 13/050,700, filed Mar. 17, 2011, 40 pages.

Pursifull, Ross Dykstra et al., "Method and System for Providing Vacuum via Excess Boost," U.S. Appl. No. 13/050,683, filed Mar. 17, 2011, 46 pages.

Ulrey, Joseph Norman et al., "Method and System for Operating an Ejector," U.S. Appl. No. 13/050,632, filed Mar. 17, 2011, 35 pages.

Vetrovec, John, "Fluid-Dynamic Supercharger", SAE Technical Paper Series 2008-01-0299; World Congress, Detroit Michigan, Apr. 14-17, 2008; 15 Pages.

White, Stephen Michael et al., "Engine Throttle Control with Brake Booster," U.S. Appl. No. 13/287,718, filed Nov. 2, 2011, 29 pages.

\* cited by examiner

METHOD AND SYSTEM FOR ENGINE AIR CONTROL

BACKGROUND/SUMMARY

An engine's powertrain control module may be configured to compute a desired throttle position based on engine operating conditions and a throttle position may be accordingly adjusted. By adjusting the throttle position, an actual intake airflow rate may be shifted towards a commanded airflow rate. The commanded throttle position, and hence the commanded airflow rate, may be adjusted to compensate for demands on the intake manifold vacuum by vacuum-based actuators, such as a vehicle brake booster.

One example approach for throttle control in view of brake booster vacuum demand is shown by Cunningham et al. in US 2011/0183812. Therein, a throttle position is adjusted in response to a rate of air flowing from the brake booster to the intake manifold so as to maintain intake manifold pressure substantially constant. For example, the throttle is closed when the brake booster is replenished with vacuum from the intake manifold.

However, the inventors herein have recognized potential issues with such an approach.

As an example, by adjusting the throttle position to achieve a desired instantaneous airflow rate in the intake manifold, an average desired airflow rate may be affected. Specifically, even though the instantaneous airflow rate (after clipping for minimum effective area constraint) is achieved, and the commanded throttle position is achieved, substantial errors may be incurred between the average actual airflow rate and the airflow rate that would be commanded if a minimum effective throttle area constraint was not encountered. As a result, engine air amount disturbances (e.g., un-throttled air flow) may be generated as air is exchanged from the brake booster to the engine intake manifold.

As another example, during brake pedal application, negative throttle angles may be required to reduce the manifold pressure variation. Since negative angles are not possible due to physical limits of the throttle, in Cunningham et al., the throttle is maintained closed as long as the negative throttle angle is commanded. Then, when the brake pedal is released and an increase in throttle angle is commanded, the throttle is moved to the commanded position. However, due to the negative throttle angle not being achieved, throttle angle errors may persist, which in turn may lead to substantial engine air amount errors. The engine air amount disturbances can increase engine emissions and may be noticeable to the driver. Additionally, the achieved intake manifold vacuum is not as low for as long as it would have been if the average air flow rate were achieved.

In one example, some of the above issues may be at least partly addressed by an engine method comprising, adjusting a signal indicative of a commanded throttle position with a correction based on an integrated airflow rate error. Then, the throttle may be actuated to the adjusted throttle position. In this way, integrated throttle angle errors and airflow rate errors may be reduced.

For example, while an engine is operating, a controller may continuously modify a commanded throttle position with a correction term (e.g., an adder) that is based on an error between an actual throttle airflow rate (or actual throttle position/angle) and the commanded throttle airflow rate (or commanded throttle position/angle). In addition, the correction term may be continuously updated based on the feedback data. In this way, the error may be substantially reduced towards zero, and on average, the actual throttle position may converge to the unclipped commanded throttle position.

In addition, during pedal transients (such as, during a brake pedal transient), the throttle position may be adjusted with the correction to reduce the integrated error. For example, if a negative throttle angle is commanded, the throttle may be closed as long as the negative throttle angle command persists. Then, when an increase in throttle angle is subsequently commanded, the throttle angle may be intentionally increased at a slower rate than desired. By slowing the rate of throttle angle increase, a throttle angle error incurred while the negative throttle angle was commanded (but not provided) may be compensated for. In this way, throttle airflow rate errors and throttle angle errors may be reduced. By substantially eliminating throttle airflow rate errors, engine air disturbances may be reduced. Overall, engine performance and emissions may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to compensating the commanded position of a throttle (such as in the engine system of FIG. 1) for airflow rate deviations so as to provide a substantially zero integrated error. During engine operation, an engine controller may continuously adjust a commanded throttle position with a correction, such as shown in FIG. 2, to provide a modified throttle position that drives the integrated airflow rate error towards zero (as shown in FIG. 4). The controller may perform a control routine, such as the example method of FIG. 3, to continuously adjust the commanded throttle position with the correction, as well as to continuously update the correction based on feedback data. The adjustment may be performed during pedal transients (e.g., brake or accelerator pedal transients), as shown in the example adjustment of FIG. 5, to also reduce throttle angle errors. In this way, a desired throttle angle may be tracked while airflow rate errors are reduced. By reducing engine air disturbances, engine performance is improved via improvements both in fuel/air ratio control and in the ability to provide intake manifold vacuum.

Figure 1:
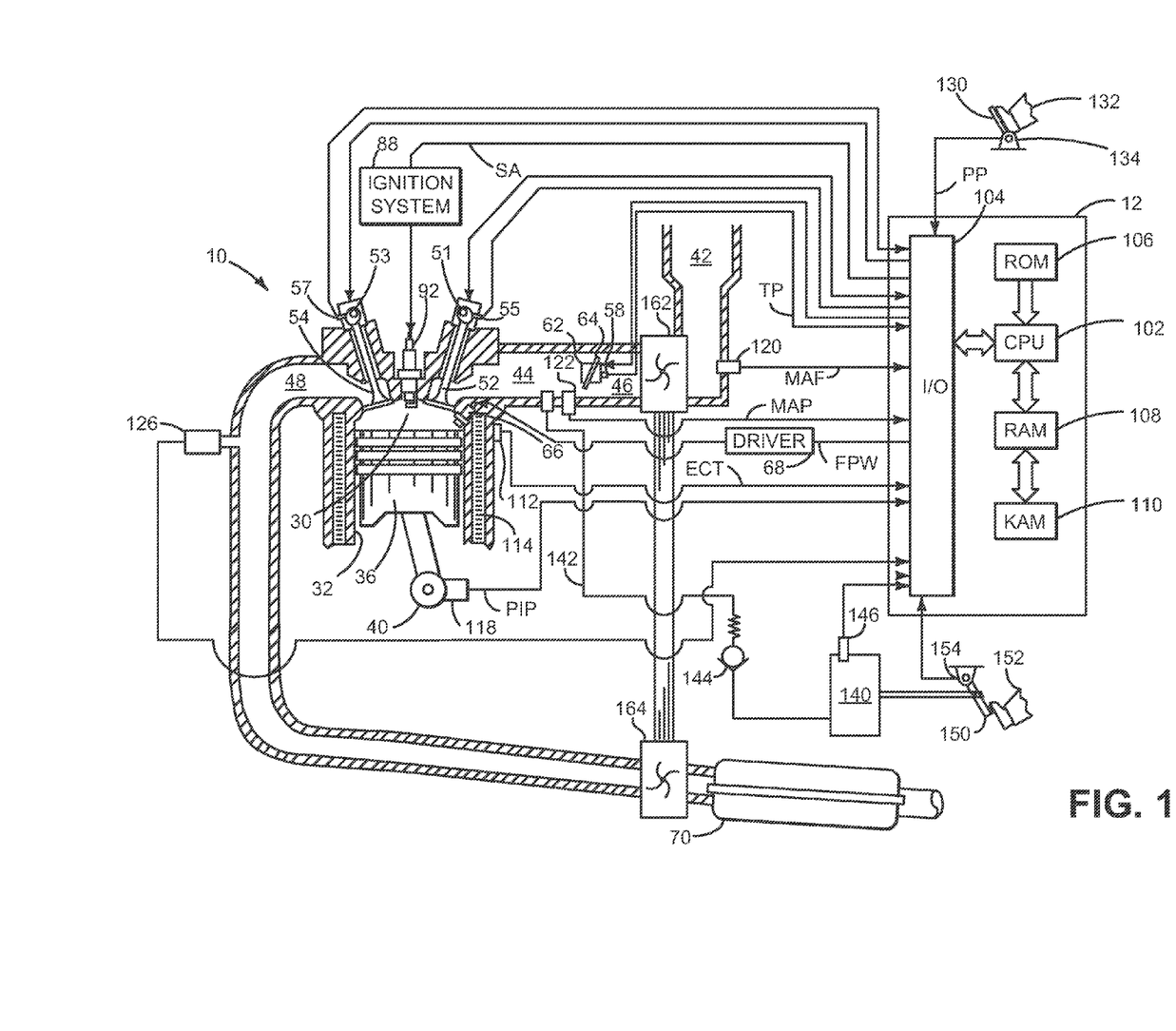
FIG. 1 shows a schematic depiction of an engine.
Figure 2:
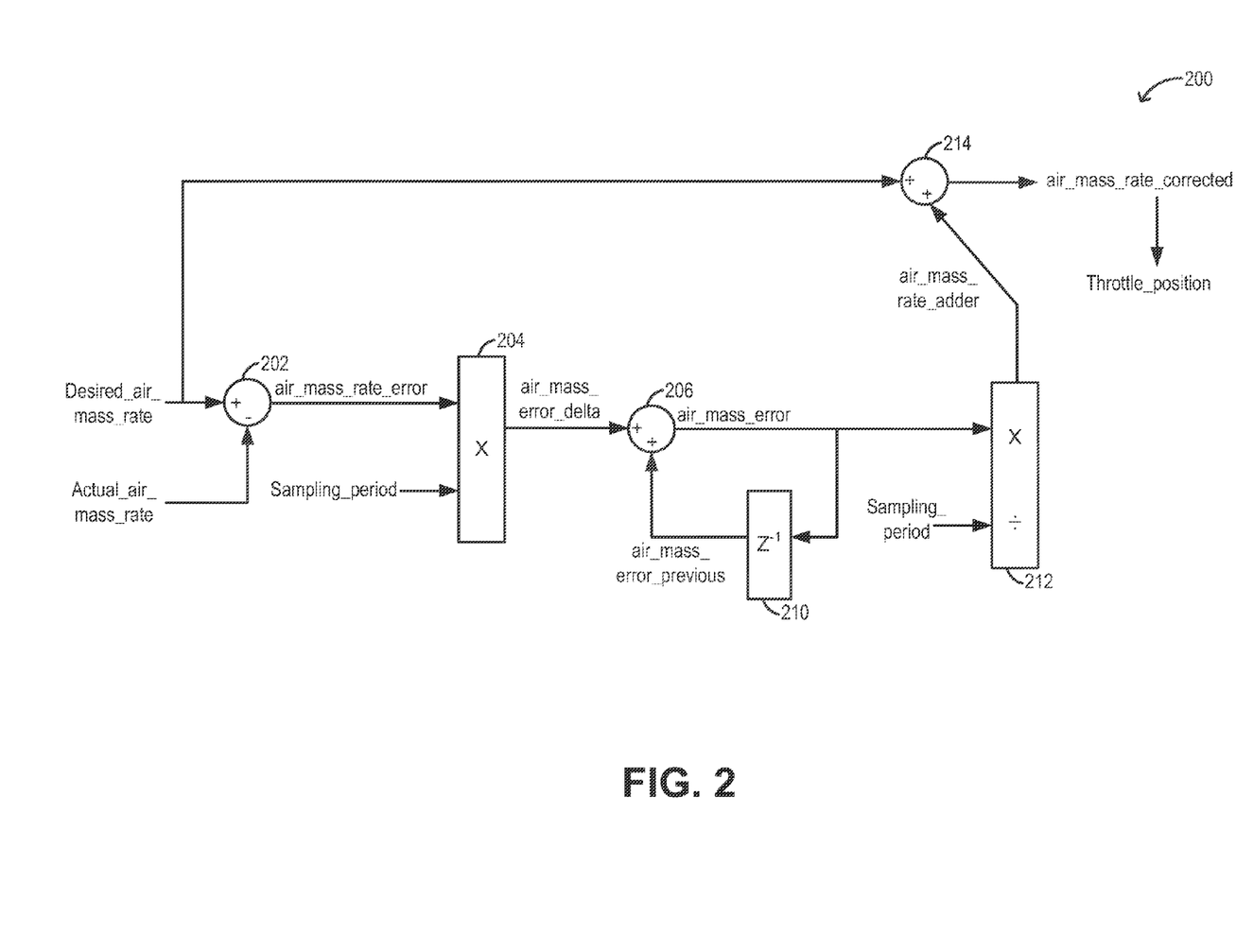
FIG. 2 shows a schematic depiction of a routine for adjusting a commanded air mass rate with a correction based on an integrated air mass rate error.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162. A high pressure, dual stage, fuel system may be used to generate higher fuel pressures at injectors 66. Intake manifold 44 also provides vacuum to brake booster 140 via conduit 142. Check valve 144 ensures air flows from brake booster 140 to intake manifold 44 and not from intake manifold 44 to brake booster 140. Brake booster 140 amplifies force provided by foot 152 via brake pedal 150 to a master cylinder (not shown) for applying vehicle brakes (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position, a pressure sensor 146 for sensing brake booster vacuum; a pressure sensor (not shown) for sensing master cylinder pressure (e.g., hydraulic brake pressure); a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Figure 3:
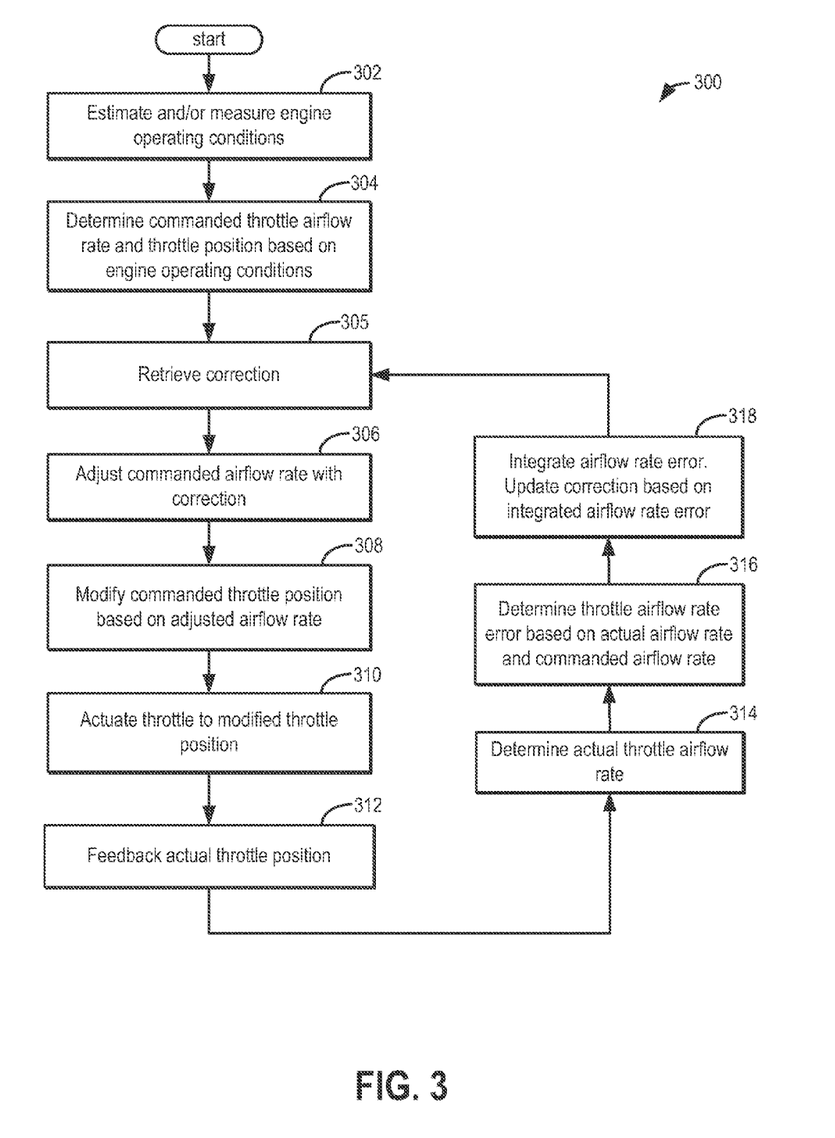
FIG. 3 shows a high level flow chart for continuously updating a correction term and adjusting a commanded throttle position with the updated correction term to reduce an integrated airflow rate error.
Figure 4:
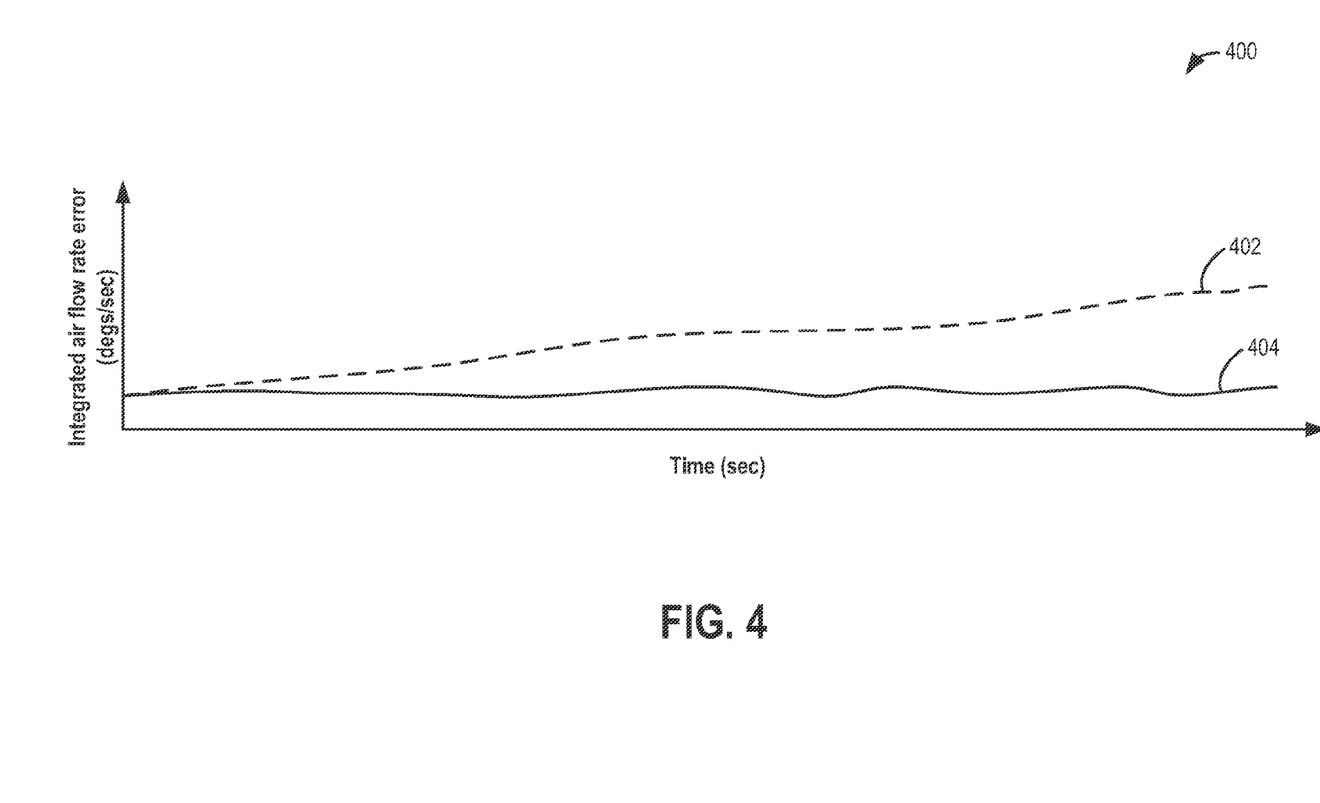
FIG. 4 shows a graph depicting a change in airflow rate error for a corrected throttle position relative to an unmodified throttle position.

As elaborated herein with reference to FIGS. 2-3, during engine operation, controller 12 may adjust a commanded throttle position with a correction to drive a throttle angle error (or throttle airflow rate error), integrated over a sampling period (such as over a defined number of engine cycles or a defined duration of engine operation) substantially towards zero. This ensures that, on average, the throttle is actually at the position that is commanded. By reducing airflow rate errors while still tracking the desired throttle angle, engine air disturbances are reduced, even in the presence of brake pedal and/or accelerator pedal transients.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine system configured to adjust a signal indicative of a commanded throttle position with a correction based on an integrated airflow rate error, and then actuate a throttle to the adjusted throttle position. The engine system includes an intake manifold and an exhaust manifold. The engine system further includes a throttle positioned in the intake manifold, a brake pedal, and a manifold pressure sensor positioned in the intake manifold downstream of the throttle. A controller with computer readable instructions may, during engine operation, estimate a throttle angle error based on a commanded throttle airflow rate relative to an actual throttle airflow rate, and integrate the throttle angle error over a sampling period. The controller may then modify a commanded throttle position with a correction that brings the integrated throttle angle error substantially towards zero before actuating the throttle to the modified throttle position. Additionally, ignition timing may be adjusted (e.g., retarded) to reduce torque or speed flares not fully compensated by the throttle control.

FIG. 2 shows a schematic representation of a method 200 for adjusting a commanded throttle position with a correction to reduce an integrated airflow rate error, wherein the correction is based on feedback data regarding airflow rates and throttle angles. As such, the method of FIG. 2 is an alternate depiction of the routine of FIG. 3. The steps of method 200 may be performed by an engine controller with computer readable instructions.

During engine operation, a desired airflow rate or air mass rate (desired_air_mass_rate) may be compared to an actual airflow rate or air mass rate (actual_air_mass_rate) to determine an air mass rate error (air_mass_rate_error). As such, the desired airflow rate may be based on engine operating conditions such as engine speed, torque demand, exhaust catalyst temperature, manifold pressure (MAP), etc. In the depicted example, the desired air mass rate and the actual air mass rate are fed into controller 202 to determine the air mass rate error. In an alternate embodiment, controller 202 may estimate a throttle angle error by comparing a commanded throttle airflow rate relative to an actual throttle airflow rate.

The determined air mass rate error (air_mass_rate_error) may be integrated by controller 204 over a control period of sampling period (sampling_period). In one example, controller 204 may be a multiplier that integrates the air mass rate error over the sampling period to determine a net change in the air mass error (air_mass_error_delta). Alternative engine controllers may be configured in mass per engine angle instead of mass per time. For these controllers, sample time translates to sample angle.

The change in air mass error on the current run of the method may be compared by controller 206 to an air mass error previously determined (air_mass_error_previous), such as an air mass rate error determined on an immediately previous run of method 200. Based on the difference, controller 206 may estimate a net air mass error (air_mass_error). The air mass error may then be used to determine a correction, such as an adder term that may be added to the desired air mass to drive the air mass error substantially towards zero. In addition, the determined air mass error may be stored at Z-transform 210 and retrieved during a subsequent run of method 200. As such, during the subsequent run of method 200, the current air mass error stored at Z-transform 210 may be retrieved to indicate a previous air mass error (air_mass_error_previous).

The net air mass error (air_mass_error) may then be integrated by controller 212 over the sampling period (sampling_period) to determine a correction, such as an adder term (air_mass_rate_adder) that may be added to the desired air mass rate to drive the integrated air mass error substantially towards zero.

The correction for the air mass rate (air_mass_rate_adder) is then added by controller 214 to the desired air mass rate to provide an adjusted or corrected air mass rate (air_mass_rate_corrected). As such, the desired air mass rate has a corresponding commanded throttle position. Herein, the corrected air mass rate is then converted to a modified commanded throttle position (throttle_position). At certain occasions, the corrected air mass rate (air_mass_rate_corrected) may not be achievable and thus will end up being clipped (a.k.a. saturated) but this arrangement will still achieve the goal of zero net sum error.

In this way, by modifying the commanded throttle position with a correction based on a commanded throttle air mass (or airflow) rate and an actual throttle air mass (or airflow) rate, the integrated air mass or airflow rate error can be substantially driven to zero while still tracking a desired throttle angle.

Now turning to FIG. 3, a method 300 is shown for adjusting a signal indicative of a commanded throttle position with a correction based on an integrated airflow rate error, and then actuating a throttle to the adjusted throttle position. This enables the integrated error to be driven towards zero.

At 302, engine operating conditions may be estimated and/or measured. These may include, for example, engine speed, driver torque demand, brake pedal position, accelerator pedal position, boost level, manifold air pressure (MAP), manifold air flow (MAF), exhaust catalyst temperature, ambient conditions (such as, ambient temperature, humidity, and barometric pressure), etc. It will be appreciated, as elaborated below, that the manifold air pressure estimate is adjusted during a brake pedal transient and/or accelerator pedal transient based on a flow rate of air flowing into an engine intake manifold.

At 304, a throttle airflow rate (or throttle air mass rate) to be commanded may be determined based on the estimated engine operating conditions. In addition, a throttle position to be commanded may be determined, where the commanded throttle position is based on the commanded throttle airflow rate.

At 305, a correction term may be retrieved. As such, the correction term may be a correction used to reduce an integrated airflow rate error substantially towards zero. The integrated airflow rate error includes an airflow rate error that is integrated over a number of engine cycles or over a duration of engine operation. In one example, the correction is an adder that is added to the commanded throttle airflow rate. In doing so, during engine operation, on average, an actual throttle position may be made to correspond to the commanded throttle position. In one example, the correction term may be stored in a look-up table of the controller's memory. Additionally, as elaborated below at 312-318, the correction term may be continuously updated (e.g., at every engine cycle) with feedback data from the most recent throttle adjustment.

At 306, the commanded throttle airflow rate may be adjusted with the correction. For example, where the correction is an adder, the correction may be added to the commanded throttle airflow rate. By applying the correction, the integrated airflow rate error may be reduced towards zero. In addition, the integrated airflow rate error may be reduced by reducing an integrated throttle angle error towards zero. At 308, based on the adjusted airflow rate, the commanded throttle position may be modified. For example, the adjusted airflow rate may be converted into a corresponding modified throttle position. Then, at 310, the routine includes actuating the throttle to the modified throttle position.

In alternate embodiments, the commanded airflow rate may be converted into a corresponding commanded throttle position (e.g., a commanded throttle angle) and the correction term may be applied directly to the commanded throttle position to provide a modified throttle position. As used herein, modifying the commanded throttle position includes continuously modifying the commanded throttle position during engine operation (e.g., at each engine cycle). In this way, by modifying a commanded throttle position with a correction based on a commanded throttle airflow rate and an actual average throttle airflow rate, a substantially zero integrated airflow rate error may be provided while still tracking a desired throttle angle.

The inventors herein have recognized that while deviations between an actual throttle position and a commanded throttle position can be used to adjust an instantaneous airflow rate, over time, throttle angle errors may get added and lead to a gradually increasing integrated throttle angle error (or integrated air flow rate error). Map 400 of FIG. 4 shows such an increase. In particular, map 400 shows a change in throttle angle error (in degs/sec along the y-axis) over time (in seconds along the x-axis). A plot of integrated throttle angle error over time in the absence of an applied correction (graph 402, dashed line) shows a gradual increase in the integrated error. Thus, an engine controller is configured to drive the integrated error to zero over time. This means that if throttle angle is too high for a period of time when a negative throttle angle is being commanded, it will be compensated later by a period of throttle angle being less than commanded transiently. As such, this increase can lead to engine air disturbances that can degrade exhaust emissions and engine performance. In comparison, a plot of the change in throttle angle error over time in the presence of an applied correction (graph 404, solid line) shows an integrated error that is on average zero over time. The inventors herein have recognized that for most engine air control applications, the integrated airflow rate may be more important than the instantaneous airflow rate. Thus, by conditioning the throttle command with the correction to provide substantially zero throttle angle error, on average, a difference between the commanded and actual airflow at the throttle is reduced to zero. As such, this reduces engine air disturbances, improving exhaust emissions and engine performance.

By enabling substantially zero integrated error, various advantages are achieved in the control of multiple systems that are sensitive to integrated air flow rate errors. As a first example, adaptive fuel control may be sensitive to integrated flow rate errors. Specifically, "short term fuel trim" and "long term fuel trim" both depend on integrated air flow rate errors. A transient error drives the short term fuel trim out of its optimum "ramp jumpback" period/pattern for minimum emissions. A systematic error caused by, for example a throttle angle constraint where negative throttle angles are not achievable, drives error into the long term fuel trim inadvertently and incorrectly. This error injects fueling error into the feed forward fuel term. Thus, by providing substantially zero integrated error, adaptive fuel control is improved.

As another example, catalyst control may be sensitive to integrated air mass flow rate errors. Specifically, catalyst control tracks the reductants and oxidants stored in the catalyst and balances them such that it can respond to a reductant excess or an oxidant excess in the feedgas. Unaccounted for air flow rate errors throw off this computation and reduce catalyst readiness. A zero net sum air flow rate controller avoids this chain of degenerating effects. Thus, by providing substantially zero integrated error, catalyst control is improved.

Intake manifold vacuum generation is also sensitive to integrated air flow rate errors. By employing a zero net sum air flow rate controller, transiently the throttle stays closed longer than it otherwise would thus aiding in the provision of intake manifold vacuum.

Returning to FIG. 3, at 312, feedback data may be used to feedback adjust the throttle position to the modified throttle position commanded by the controller. This fed back throttle position reflects any positioning constraint of the throttle position controller. At 314, an actual throttle airflow rate may be determined. In one example, the actual average throttle airflow rate may be based on an intake manifold air pressure estimate. Besides actual throttle position, actual airflow rate may be based on MAF or MAP.

At 316, a throttle airflow rate error may be determined based on the actual throttle airflow rate and the commanded (modified) throttle airflow rate. Then, at 318, the throttle airflow rate error may be integrated over a number of engine cycles, or a duration of engine operation, to determine an integrated throttle airflow rate error. Based on the integrated airflow rate error on the current cycle, the correction term may be revised so that an updated correction term is generated and stored in the controller's memory. Then, during a subsequent cycle, the updated correction term may be retrieved from the look-up table and the commanded throttle airflow rate (or commanded throttle position) may be modified with the revised correction term.

It will be appreciated that the routine of FIG. 3 may also be performed during pedal transients. In particular, an estimate of manifold air pressure may be adjusted during a brake pedal transient and/or accelerator pedal transient based on a flow rate of air flowing into an engine intake manifold (e.g., from the brake booster). Then, a signal indicative of a commanded throttle position may be adjusted to bring the integrated throttle airflow rate error towards zero. Thus, during a pedal transient, when the commanded throttle position is outside a throttle position limit, a controller may maintain the throttle position at the limit for a duration until the integrated airflow rate error is reduced towards zero and then, after the integrated flow rate error has been reduced, the controller may actuate the throttle to the adjusted throttle position.

As an example, during a pedal transient (e.g., for a brake pedal and/or an accelerator pedal) when the throttle position is commanded to be decreased outside a throttle position limit (e.g., when a negative throttle angle is commanded), the controller may decrease the throttle position to the throttle position limit (e.g., maintain the throttle fully closed). As such, the throttle may have physical motion limits as well as response limits. Herein, the controller may maintain the throttle at the throttle position limit as long as the commanded throttle position remains outside the limit. Then, during a subsequent commanded increase in the throttle position, the controller may intentionally increase the throttle position at a slower rate than was commanded. In this way, a commanded throttle position may be adjusted with the correction to reduce the integrated throttle angle error, and reduce engine air disturbances. An example throttle adjustment during a pedal transient is shown at FIG. 5.

In this way, by continuously modifying a commanded throttle position with a correction factor that brings the integrated throttle angle error substantially towards zero, engine air disturbances may be reduced and emissions may be improved.

Figure 5:
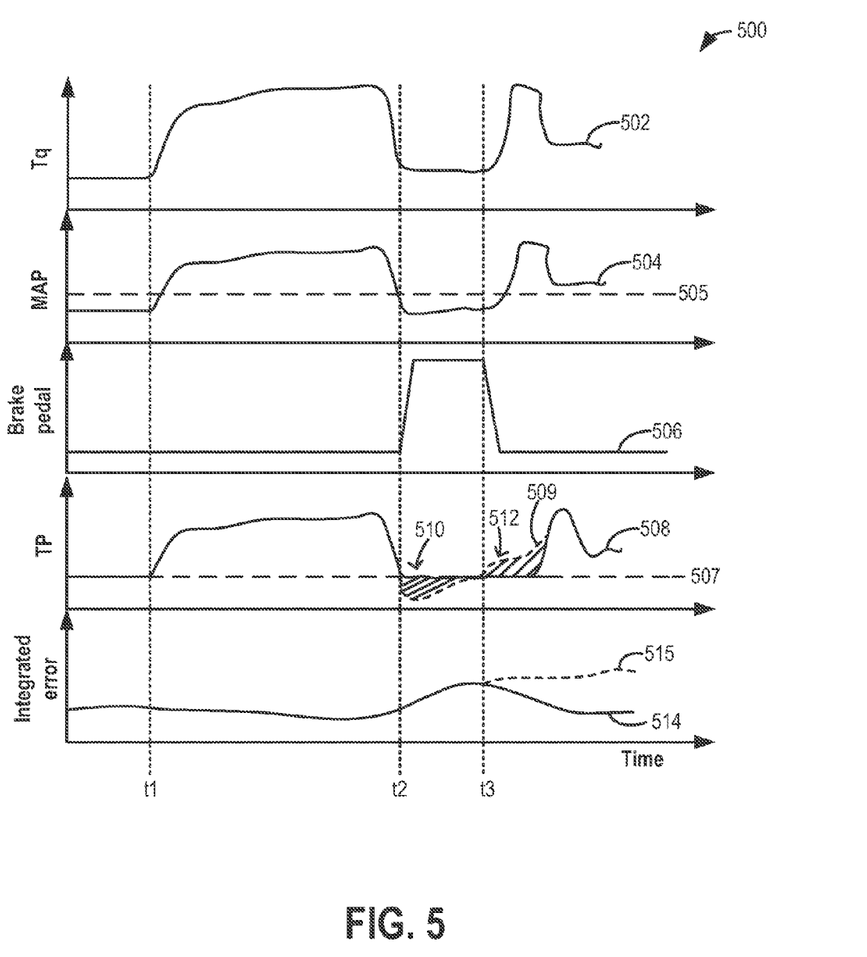
FIG. 5 shows an example adjustment of a throttle position during a pedal transient based on an airflow rate error, according to the present disclosure.

Now turning to FIG. 5, map 500 shows an example adjustment to a commanded throttle position to reduce an integrated throttle angle error during engine operation and during a brake pedal transient. In particular, a desired engine torque output (Tq) is shown at graph 502, changes in manifold pressure (MAP) relative to an atmospheric pressure (dashed line 505) are shown at graph 504, an indication regarding a brake pedal position is shown at graph 506, an indication regarding a commanded throttle position (TP) is shown at graph 508 (and segment 509), and a change in the integrated throttle angle error is shown at graphs 514 (in the presence of an applied correction, solid line) and 515 (in the absence of an applied correction, dashed line). All graphs are plotted over time (along the x-axis).

Before t1, the engine is operating at a low desired engine torque condition, for example, at idle conditions. Further, the intake manifold pressure is at a vacuum condition, the vehicle brake is not actuated (that is, a brake booster vacuum is at a higher level), and the engine intake throttle is mostly closed. Additionally, spark timing may be advanced (not shown).

At t1, desired engine torque (graph 502) begins to increase and stays at a higher level until just before t2 where it is reduced. Intake manifold pressure (graph 504) begins at a vacuum condition (that is, below atmospheric pressure line 505) and is transitioned to a positive pressure condition. The vehicle brake is not applied between t1 and t2. Since the brake is not actuated during this time, air flow from the intake manifold to the brake booster may be limited (e.g., via a check valve, such as valve 144 of FIG. 1). The engine throttle position follows a trajectory that is similar to the desired engine torque from t1 to t2. From t1 to t2, the engine throttle position and desired engine torque follow a trajectory representative of vehicle acceleration. In addition, engine spark may be retarded (not shown) to reflect engine operation at a higher load. As such, between t1 and t2, the commanded throttle position may be continuously modified with a correction term before actuating the throttle to the modified throttle position so as to maintain an integrated airflow rate error (or throttle angle error) substantially at zero (as indicated by graph 514).

At t2, the desired engine torque is at a low level indicating that the vehicle is at idle, decelerating, or coasting. Intake manifold pressure falls with the drop in desired engine torque just before t2, and intake manifold pressure is at a vacuum just before t2. Then at t2, the vehicle brake is applied as indicated by the change in brake pedal position. Between t2 and t3, the brake pedal position remains substantially constant after the initial brake application up to brake release at t3. When the vehicle brake is applied, a brake booster pressure increases as a diaphragm in the brake booster compresses the brake booster vacuum chamber. Consequently, the check valve opens to equalize the pressure between a brake booster vacuum chamber and the intake manifold. During these conditions, air flows from the brake booster to the intake manifold via the check valve. In the absence of a throttle adjustment to compensate for the sudden air flow from the brake booster to the intake manifold, a bump (or surge) in MAP may be expected. Thus, to reduce MAP errors while the brake is applied (that is, during a brake pedal transient), a desired throttle airflow rate, and a corresponding desired throttle position may be determined.

In the depicted example, the throttle adjustment actually required to fully compensate for the brake booster airflow is a negative throttle position (as shown by dashed segment 509). However, such a position is outside a throttle position limit 507. In one example, throttle position limit 507 is a physical limit of the throttle, wherein when the throttle is at limit 507, the throttle is maintained fully closed. Thus, as long as a negative throttle position is requested (shown by dotted line 509) during the brake pedal transient, the throttle may actually be positioned at limit 507, as shown by graph 508 (solid line). Additionally, spark may be adjusted to a sub-optimum setting at this time so that engine torque is substantially maintained even though the transient air flow rate is higher than desired during this event. However, due to the throttle position being at the limit while it was required to be at a negative position, an integrated flow rate error may accrue, depicted herein by hatched area 510, as well as the accrued integrated error at graph 514. It should be noted that the desired engine torque does not follow the change in throttle position but rather remains constant since no driver input is present. Closing of the throttle temporarily compensates the effect of un-throttled air flowing from the brake booster to the intake manifold, but affects the integrated airflow rate error.

At t3, the vehicle brake is released while the desired engine torque remains substantially constant and at a lower level. Additionally, an accelerator pedal may be applied (not shown) while the brake pedal is released. When the vehicle brake is released, a valve within the brake booster closes allowing air that acted on the brake booster diaphragm during brake application to be released into the brake booster vacuum chamber.

In response to the accelerator pedal being applied at t3, the driver torque demand may increase and a higher MAP is required. to provide this, a more open throttle position may be commanded (as shown at dashed segment 509) to provide the desired airflow. As such, if the throttle position were adjusted as requested, the integrated error accrued previously (depicted by hatched area 510) may persist. Specifically, the throttle position adjustments commanded t2 onwards may enable MAP to be maintained, but in the absence of a correction, may lead to a gradual increase in the integrated error, as shown by graph 515 (dashed line).

Thus, to drive the integrated error towards zero, the commanded throttle position may be adjusted with a correction. Specifically, even though the negative throttle position command is removed and a positive throttle position is commanded at t3, the throttle position may be intentionally maintained at the closed throttle position (e.g., at throttle position limit 507), as shown by graph 508 (solid line). Further, the throttle is intentionally maintained closed until the integrated error is reduced. Specifically, for a duration after t3, due to the throttle position being maintained at the limit while it was required to be at a positive position, an integrated flow rate error may accrue, depicted herein by hatched area 512. However, the positive error depicted by hatched area 512 may compensate for (or counteract, on average) the negative error depicted by hatched area 510 such that after t3, the accrued integrated error is drawn on, as shown at graph 514.

The throttle position is maintained closed until the integrated error accrued at hatched area 512 drives the integrated error accrued at hatched area 510 substantially to zero. Then, as shown by solid line 509, the throttle position may be shifted to a more open position, to coincide with the commanded positive throttle position.

In this way, during a pedal transient when the throttle position is commanded to be decreased outside a throttle position limit, the controller decreases the throttle position to the throttle position limit, and during a subsequent commanded increase in the throttle position, the controller intentionally increases the throttle position at a slower rate than commanded. By conditioning the throttle signal such that the integrated error is substantially zero, un-throttled air sources, such as a brake booster air, can be effectively compensated during engine air control. In particular, MAP deviations, such as expected during a brake booster evacuation, may be reduced.

As an alternate example, in response to a first brake pedal transient (herein, brake pedals being applied), where the commanded throttle position is outside a lower limit (herein, a lower physical limit of the throttle), the controller may decrease the throttle position to the lower limit. Then, in response to a second brake pedal transient (herein, brake pedals being released) where the commanded throttle position is increased, the controller may slowly increase the throttle position from the lower limit until the throttle angle error is reduced substantially towards zero, and then rapidly increasing the throttle position to the commanded throttle position.

In this way, by adjusting a commanded throttle airflow rate with a correction, substantially zero integral error on a throttle angle (or desired air mass rate) may be achieved without negatively impacting a throttle positioning dynamic response. By reducing the integrated error, MAP deviations arising due to un-throttled air sources may be effectively compensated for. In addition, throttle wear may be reduced. Overall, engine performance is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method comprising:
adjusting a signal indicative of a commanded throttle position with a correction based on an integrated airflow rate error; and
actuating a throttle to the adjusted throttle position.

2. The method of claim 1, wherein the adjusting based on the integrated airflow rate error includes adjusting with the correction to reduce the integrated airflow rate error substantially towards zero.

3. The method of claim 1, further comprising, reducing the integrated airflow rate error by reducing an integrated throttle angle error towards zero.

4. The method of claim 1, wherein the integrated airflow rate error includes an airflow rate error integrated over a number of engine cycles.

5. The method of claim 1, wherein the integrated airflow rate error includes an airflow rate error integrated over a duration of engine operation.

6. The method of claim 1, wherein the integrated airflow rate error is based on an estimate of manifold air pressure.

7. The method of claim 6, wherein the estimate of manifold air pressure is adjusted during a brake pedal transient and/or accelerator pedal transient based on a flow rate of air flowing into an engine intake manifold.

8. The method of claim 1, wherein the adjusting a signal indicative of a commanded throttle position includes, during a pedal transient, when the commanded throttle position is outside a throttle position limit, increasing the throttle position from the limit for a duration until the integrated airflow rate error is reduced towards zero and then actuating the throttle to the adjusted throttle position.

9. An engine method comprising:
during engine operation,
modifying a commanded throttle position with a correction based on a commanded throttle airflow rate and an actual average throttle airflow rate to provide substantially zero integrated airflow rate error while still tracking a desired throttle angle.

10. The method of claim 9, wherein the modifying includes continuously modifying the commanded throttle position during the engine operation.

11. The method of claim 9, wherein the actual average throttle airflow rate is based on an intake manifold air pressure.

12. The method of claim 9, wherein the integrated airflow rate error includes an airflow rate error that is integrated over a number of engine cycles.

13. The method of claim 9, further comprising, actuating a throttle to the modified throttle position.

14. The method of claim 9, further comprising, during a pedal transient when the throttle position is commanded to be decreased outside a throttle position limit, decreasing the throttle position to the throttle position limit, and during a subsequent commanded increase in the throttle position, intentionally increasing the throttle position at a slower rate than commanded.

15. The method of claim 14, wherein the pedal includes a brake pedal and/or an accelerator pedal.

16. The method of claim 9, further comprising, during a pedal transient when the throttle position is commanded to be decreased outside a throttle position limit, decreasing the throttle position to the throttle position limit, and during a subsequent commanded increase in the throttle position, intentionally increasing the throttle from the throttle position limit for a duration until the integrated airflow rate error is reduced substantially towards zero.

17. The method of claim 16, further comprising, after the duration, increasing the throttle position to the commanded throttle position.

18. A vehicle system, comprising,
an engine including an intake manifold and an exhaust manifold;
a throttle positioned in the intake manifold;
a brake pedal;
a manifold pressure sensor positioned in the intake manifold downstream of the throttle; and
a controller with computer readable instructions for:
during engine operation,
estimating a throttle angle error based on a commanded throttle airflow rate relative to an actual throttle airflow rate;

integrating the throttle angle error over a sampling period;

modifying a commanded throttle position with a correction factor that brings the integrated throttle angle error substantially towards zero; and actuating the throttle to the modified throttle position.

19. The system of claim 18, wherein the sampling period includes a number of engine cycles or a duration of engine operation.

20. The system of claim 18, wherein the controller includes further instructions for, in response to a first brake pedal transient where the commanded throttle position is outside a lower limit, decreasing the throttle position to the lower limit; and in response to a second brake pedal transient where the commanded throttle position is increased, slowly increasing the throttle position from the lower limit until the throttle angle error is reduced substantially towards zero, and then rapidly increasing the throttle position to the commanded throttle position.

* * * * *